United States Patent
Ohta et al.

(10) Patent No.: US 10,653,147 B2
(45) Date of Patent: May 19, 2020

(54) AGROCHEMICAL COMPOSITION AND DISPERSAL METHOD THEREFOR

(71) Applicant: KUMIAI CHEMICAL INDUSTRY CO., LTD., Tokyo (JP)

(72) Inventors: Yuichiro Ohta, Tokyo (JP); Toshinobu Yamazaki, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/778,711

(22) PCT Filed: Nov. 28, 2016

(86) PCT No.: PCT/JP2016/085220
§ 371 (c)(1),
(2) Date: May 24, 2018

(87) PCT Pub. No.: WO2017/094678
PCT Pub. Date: Jun. 8, 2017

(65) Prior Publication Data
US 2018/0352813 A1    Dec. 13, 2018

(30) Foreign Application Priority Data
Nov. 30, 2015  (JP) ................. 2015-234180

(51) Int. Cl.
| A01N 47/12 | (2006.01) |
| A01N 25/04 | (2006.01) |
| A01N 25/30 | (2006.01) |
| A01N 31/14 | (2006.01) |

(52) U.S. Cl.
CPC ............ *A01N 47/12* (2013.01); *A01N 25/04* (2013.01); *A01N 25/30* (2013.01); *A01N 31/14* (2013.01); *A01N 2300/00* (2013.01)

(58) Field of Classification Search
None
See application file for complete search history.

(56) References Cited

U.S. PATENT DOCUMENTS

| 2008/0214401 A1 | 9/2008 | Alexander |
| 2011/0233812 A1 | 9/2011 | Fujita et al. |
| 2013/0190181 A1 | 7/2013 | Alexander |
| 2014/0163018 A1 | 6/2014 | Fukuchi et al. |

FOREIGN PATENT DOCUMENTS

| CN | 104982451 | 10/2015 |
| CN | 104996450 | 10/2015 |
| EP | 0 226 815 | 7/1987 |
| EP | 1 090 551 | 4/2001 |
| JP | 61-236701 | 10/1986 |
| JP | 62-126101 | 6/1987 |
| JP | 63-267703 | 11/1988 |
| JP | 6-256122 | 9/1994 |
| JP | 8-34702 | 2/1996 |
| JP | 2001-106666 | 4/2001 |
| JP | 2002-338402 | 11/2002 |
| JP | 2003-212702 | 7/2003 |
| JP | 2005-336170 | 12/2005 |
| JP | 2012-250920 | 12/2012 |
| WO | 2006/128836 | 12/2006 |
| WO | 2010/064513 | 6/2010 |

OTHER PUBLICATIONS

International Search Report dated Jan. 31, 2017 in International Application No. PCT/JP2016/085220.
Kenichi Kida, "Agchem Age", No. 195, Nippon Soda Co., Ltd., Dec. 2013, pp. 12-17.
Decision to Grant, dated Jan. 23, 2019 in corresponding Japanese Patent Application No. 2017-553850, with English language translation.
Encyclopedia of Chinese Chemical Products (3$^{rd}$ edition, vol. II, Organization for Chemical Industry Press, Jan. 2005, p. 830.
Pesticide Processing and Management, SHEN Jinliang, Jun. 2002, p. 25.
Office Action dated Apr. 29, 2019 in Chinese Patent Application No. 201680070001.0, with English translation.
Extended Search Report dated Apr. 25, 2019 in European Patent Application No. 16870615.8.

*Primary Examiner* — Alton N Pryor
(74) *Attorney, Agent, or Firm* — Wenderoth, Lind & Ponack, L.L.P.

(57) ABSTRACT

Provided are an agrochemical composition containing pyribencarb which has good blendability with an agrochemical composition containing etofenprox, and a method for spraying the composition. The agrochemical composition which contains pyribencarb (A) and a surfactant (B), characterized in that as the surfactant (B), a lignin sulfonic acid salt having purity of 85% by mass or more, wherein the content of reducing sugars is less than 5% by mass and the content of sugar sulfonic acids is less than 6% by mass (B1), and a monoalkylarylsulfonic acid salt formalin condensate and/or a polycarboxylic acid salt having mass average molecular weight of 5,000 to 50,000 (B2) are exclusively included; and the method for spraying the composition.

10 Claims, No Drawings

AGROCHEMICAL COMPOSITION AND DISPERSAL METHOD THEREFOR

TECHNICAL FIELD

The present invention relates to an agrochemical composition containing pyribencarb which is an agrochemically active component, and a method for spraying the composition. In particular, it relates to an agrochemical composition containing pyribencarb which has good blendability with an agrochemical composition containing etofenprox, and a method for spraying the composition.

BACKGROUND ART

An agrochemically active component, pyribencarb or methyl={2-chloro-5-[(E)-1-(6-methyl-2-pyridylmethoxyimino) ethyl] benzyl} carbamate is a known benzyl carbamate-based bactericidal agrochemically active component, which is disclosed in Patent Document 1 for the first time. Non Patent Document 1 discloses that it is characterized by having a wide range of control spectrum and exhibiting an excellent control effect on diseases of fruits and vegetables such as gray mold, crown rot, brown rot and the like, caused by various phytopathogenic fungi including ascomycetes.

Harmful organisms to be controlled in agriculture include plants (weeds), animals (pests), microorganisms (phytopathogenic fungi and bacteria, etc.). Practically, there is no universal agrochemically active component that exerts its action on all of them without causing adverse effects on useful plants. In modern agriculture, agricultural land is managed taking advantage of herbicidal active components for weed control, insecticidal active components for pest control, and fungicidal active components for disease control, respectively. In addition, a single herbicidal active component, a single insecticidal active component or a single microbicidal active component is not necessarily successful in controlling all weeds, all pests or all microorganisms. There usually exist high sensitive species and low sensitive species of grass, insects, or fungi for each agrochemically active component. Considering such circumstances, in order to control all harmful organisms for a wide variety of agricultural land etc., it is necessary to combine a plurality of agrochemically active components depending on the subject to be controlled.

To meet such needs, several mixed agrochemical compositions containing multiple agrochemically active components are commercially available. However, the number of combinations of agrochemically active components is enormous, and it is practically impossible from the aspect of profitability to commercialize all of them as a mixed agrochemical composition taking into consideration the market size of each mixed agrochemical composition. In addition, each agrochemically active component has inherent physicochemical properties. For example, there are some combinations such as an acidic agrochemically active component and a basic agrochemically active component, which may be difficult to be prepared into an agrochemical composition because they mutually exert adverse effect on their respective stability.

Therefore, when a combination of agrochemically active components, which is not commercially available as a mixed agrochemical composition, is to be applied to agricultural land etc., it is necessary to separately prepare and apply the agrochemical compositions containing the respective agrochemically active components. However, performing complicated spraying operations as many number as the prepared agrochemical compositions requires a great deal of labor and time for farmers. Accordingly, it is widely practiced to mix a plurality of agrochemical compositions on site and spray the mixture to complete agrochemical treatment by a single spraying operation. The operation to mix the plurality of agrochemical compositions on site is referred to as blending or tank mix. The latter may sometimes refer to a mixture prepared on site.

However, as mentioned above, each agrochemically active component has its own physicochemical properties. Depending on the particular combination of agrochemically active components to be mixed, it typically causes undesirable phenomena such as aggregation, which may interfere with spraying operation. Also, regardless of the compatibility of the agrochemically active components, the auxiliary component such as surfactant used in one agrochemical composition may exert undesirable effects on the other components contained in the other agrochemical composition to be mixed. Generally, an agrochemical composition is a formulation that has been thoroughly examined for constitution in order to ensure quality, that is, physicochemical properties and storage stability. It is in a high-quality form as long as it is completed as a single package. However, the actual performance is not necessarily guaranteed when external factors are introduced, that is, when blended with other agrochemical compositions.

As mentioned above, the pyribencarb is an antifungal active component and does not exhibit herbicidal and/or insecticidal activity. Accordingly, an agrochemical composition containing the pyribencarb as an agrochemically active component is considered to be used being blended with an agrochemical composition containing another agrochemically active component, especially an insecticidal active component in some cases. One example of the insecticidal active component widely used in Japan is etofenprox. However, when the pyribencarb was added to the diluted solution of the agrochemical composition containing the etofenprox, aggregates formed rapidly. In addition, the agrochemical composition containing the pyribencarb prepared according to a conventional method also had good dilution performance by itself, but a similar aggregation tendency was observed when blended with an agrochemical composition containing the etofenprox. That is, there was a problem with the blendability between two of them.

If blendability of a combination of individual agrochemical compositions is not good, agrochemical composition manufacturers can freely adjust the constitution of each component depending on their own arbitrary decision, when both of agrochemical compositions to be mixed are their proprietary preparations. However, if manufacturers of each agrochemical composition are different, it is not possible to modify the constitution of agrochemical compositions produced by others. Therefore, one should study the constitution of an agrochemical composition manufactured by oneself and try to improve blendability with an agrochemical composition produced by others. However, it is extremely difficult to attain the goal under such constraint that a cause of poor blendability included in the agrochemical composition produced by others, if any, cannot be eliminated.

Patent Document 2 discloses a wettable powders composition for agriculture/horticulture having good physical properties which is characterized in that it contains an alkylenebisdithiocarbamate metal salt or bisdimethyldithiocarbamoyl zinc ethylenebisdithiocarbamate as an active component and 0.2 to 5% by weight of at least one of hydroxypropyl cellulose and hydroxypropyl methyl cellulose, as an example of prior art which improves blendability of an agrochemical composition under the aforementioned constraint. Patent Document 3 discloses an aqueous suspension agrochemical composition which contains a sulfur particulate as an active component; and two or more non-ionic surfactants selected from polyoxyethylenealkylphenol, polyoxyalkylenearylphenyl ether and polyoxyethylenealkylphenyl ether, and one or more anionic surfactants selected from naphthalene sulfonic acid-based and dialkylsulfosuccinate, as dispersants. Patent Document 4 discloses an aqueous suspension composition containing finely pulverized calcium carbonate as an active component.

RELATED ART DOCUMENTS

Patent Documents

PATENT DOCUMENT 1: JP2001-106666A
PATENT DOCUMENT 2: JPS63-267703A
PATENT DOCUMENT 3: JPH6-256122A
PATENT DOCUMENT 4: JP2003-212702A

Non Patent Document

NON PATENT DOCUMENT 1: Kenichi Kida, "Agchem Age", No. 195, NIPPON SODA CO., LTD., December, 2013, pp. 12-17

SUMMARY OF THE INVENTION

Problems to be Solved by the Invention

However, all of the agrochemical compositions described in Patent Documents 2 to 4 are limited to those containing agrochemically active components different from pyribencarb. In addition, the other agrochemical compositions having improved blendability are also limited. Therefore, it could not be employed as a technique to improve the blendability of an agrochemical composition containing pyribencarb and an agrochemical composition containing etofenprox.

Therefore, it is an object of the present invention to provide an agrochemical composition containing pyribencarb which has good blendability with an agrochemical composition containing etofenprox; and a method for spraying the composition.

Means for Solving the Problems

As a result of intensive study, the present inventors have found that an agrochemical composition characterized by containing pyribencarb and a certain surfactant may solve the problems mentioned above, thereby completing the present invention.

The present invention will be described below.

[1] An agrochemical composition which comprises pyribencarb (A), and a surfactant (B), characterized in that, as the surfactant (B), a lignin sulfonic acid salt having purity of 85% by mass or more wherein the content of reducing sugars is less than 5% by mass and the content of sugar sulfonic acids is less than 6% by mass (B1), and a monoalkylarylsulfonic acid salt formalin, condensate and/or a polycarboxylic acid salt having mass average molecular weight of 3,000 to 50,000 (B2) are exclusively included.

[2] The agrochemical composition according to [1], wherein the monoalkylaryl sulfonic acid salt formalin condensate is C1 to C4 alkylnaphthalene sulfonic acid salt formalin condensate.

[3] The agrochemical composition according to [1] or [2], wherein the compounding ratio of the surfactant (B) is 1% by mass or less based on the total amount of the composition.

[4] The agrochemical composition according to any one of [1] to [3], which further contains an antifoaming agent.

[5] The agrochemical composition according to [4], wherein the compounding ratio of the antifoaming agent is 0.01 to 0.5% by mass based on the total amount of the composition.

[6] The agrochemical composition according to any one of [1] to [5], which does not contain a water-insoluble organic solvent.

[7] The agrochemical composition according to any one of [1] to [6], which is an aqueous suspension preparation.

[8] A method, for producing the agrochemical composition according to any one of [1] to [7], characterized in that the lignin sulfonic acid salt having purity of 85% by mass or more, wherein the content of the reducing sugars is less than 5% by mass and the content of the sugar sulfonic acids is less than 6% by mass, is obtained by purifying a lignin sulfonic acid salt.

[9] A mixed agrochemical preparation, which is a mixture of the agrochemical composition according to any one of [1] to [7] and an agrochemical composition containing etofenprox, characterized in that the compounding ratio of the lignin sulfonic acid salt having purity of 85% by mass or more wherein the content of the reducing sugars is less than 5% by mass and the content of the sugar sulfonic acids is less than 6% by mass (B1) is 0.1 to 0.95% by mass, and the compounding ratio of the monoalkylarylsulfonic acid salt formalin condensate and/or polycarboxylic acid salt having mass average molecular weight of 5,000 to 50,000 (B2) is 0.05 to 0.5% by mass, based on the total amount of the agrochemical composition according to any one of [1] to [7].

[10] A method for spraying mixed agrochemicals which is characterized in that the agrochemical composition according to any one of [1] to [7] and an agrochemical composition containing etofenprox are diluted in water for spraying, and thus prepared mixed agrochemical spray solution is sprayed onto agricultural land or non-agricultural land.

[11] The method for spraying mixed agrochemicals according to [10], wherein, aerial spraying is conducted from an aircraft with function for spraying agrochemicals onto agricultural land or non-agricultural land.

Effects of the Invention

According to the present invention, it is possible to provide an agrochemical composition which contains pyribencarb having good blendability with an agrochemical composition which contains etofenprox, and a method for spraying the composition.

Mode for Carrying Out the Invention

In this specification, "water for spraying" refers to water which dilutes the agrochemical composition of the present invention. The water herein represents pure water or distilled water and may contain trace amounts of agriculturally or industrially acceptable impurities. It is also possible to use drinking water such as mineral water or tap water, and agricultural or industrial water prepared by duly treating groundwater or river water. Further, the water for spraying may be an aqueous liquid containing a predetermined amount of spreading agent and/or another agrochemical preparation diluted in the water mentioned above. "Dilution factor" means the part by volume of the spray solution prepared by diluting 1 part by volume of an agrochemical composition (in the case where the agrochemical composition is a solid preparation, one part by mass is regarded as one part by volume). For example, when 1 L of an agrochemical composition which is a liquid preparation is diluted with water for spraying to prepare 16 L of a spray solution, the dilution factor is 16 times. In the present specification, "concentration" of a substance refers to mass concentration unless otherwise specified. In this specification, in reference to a phrase "molecular weight" of a polymer having a molecular weight distribution, the phrase refers to a mass average molecular weight.

The agrochemical composition of the present invention is an agrochemical composition comprising pyribencarb (A) and a surfactant (B). The agrochemical composition of the present invention has good blendability with an agrochemical composition containing etofenprox. It can be used without being mixed with an agrochemical composition containing etofenprox or it can be mixed with an agrochemical composition containing various agrochemically active components other than etofenprox.

In the present invention, pyribencarb [component (A)] is compounded as an agrochemically active component. The compounding ratio of the pyribencarb is usually in the range of 5 to 40% by mass, preferably 10 to 30% by mass, based on the total amount of the agrochemical composition.

In the present invention, a surfactant [component (B)] is also compounded, and it is important that a lignin sulfonic acid salt having purity of 85% by mass or more, wherein the content of the reducing sugar is less than 5% by mass and the content of the sugar sulfonic acids is less than 6% by mass (B1), and a monoalkylarylsulfonic acid salt formalin condensate and/or polycarboxylic acid salt having mass average molecular weight of 5,000 to 50,000 (B2) are exclusively contained. Some of antifoaming agents described below show surface activity, but the antifoaming agent shall not correspond to the surfactant in the present invention.

The lignin sulfonic acid having purity of 85% by mass or more, wherein the content of the reducing sugars is less than 5% by mass and the content of the sugar sulfonic acids is less than 6% by mass, which is used as a component (B1) in the present invention (hereinafter also referred to as "lignin sulfonic acid salt (B1)") is compounded for the purpose of wet spreading of solid components including pyribencarb. The lignin sulfonic acid salt (B1) can be obtained by purification. It is important to adjust the contents of impurities, i.e., the reducing sugars and the sugar sulfonic acids to the range. The purification may be carried out by a know method, for example, pH control, ion exchange, ultrafiltration, size exclusion chromatography or the like. Commercially available lignin sulfonic acid salts can also be used, so long as the contents of the reducing sugars and sugar sulfonic acids as impurities are within such ranges. The lignin sulfonic acid salt of the present invention more preferably has a purity of 90% by mass or more.

The lignin sulfonic acid salt (B1) is not particularly limited by the cationic species which form the salt and includes an alkali metal salt such as a sodium salt and a potassium salt; an alkaline earth metal salts such as a calcium salt and a barium salt; a magnesium salt; an ammonium salt and the like, all of which can be used in the present invention. As such a lignin sulfonic acid salt, a lignin sulfonic acid salt which is a multiple salt with a plurality of cationic species can also be used. Furthermore, modified lignin sulfonic acid salt such as partially desulfonated lignin sulfonic acid salt obtained by eliminating some of the sulfo groups is also included in the lignin sulfonic acid salt of the present invention. The lignin sulfonic acid salt (B1) may be optionally used alone or in combination of two or more.

The compounding ratio of the lignin sulfonic acid salt (B1) is usually in the range of 0.1 to 0.95% by mass, preferably 0.4 to 0.7% by mass based on the total amount of the agrochemical composition. When blended with an agrochemical composition containing etofenprox, the compounding ratio exceeding 0.95% by mass may result in aggregate formed in the dilute solution. However, the agrochemical composition of the present invention exhibits good performance as long as it is used singly or in combination with an agrochemical composition containing agrochemically active components other than etofenprox, even if the compounding ratio of the lignin sulfonic acid salt (B1) exceeds 0.95% by mass.

In the present invention, the monoalkylarylsulfonic acid salt formalin condensate and the polycarboxylic acid salt having mass average molecular weight of 5,000 to 50,000 used as the component (B2) are blended in order to aid wet spreading and dispersion of the solid component by the lignin sulfonic acid salt.

As the monoalkylarylsulfonic acid salt formalin condensate, C1 to C4 alkyl naphthalenesulfonic acid salt formalin condensate such as methylnaphthalenesulfonic acid salt formalin condensate, isopropylnaphthalenesulfonic acid salt formalin condensate, butylnaphthalenesulfonic acid salt formalin condensate is preferred. The monoalkylarylsulfonic acid salt formalin condensate includes an alkali metal salt such as a sodium salt and a potassium salt; an alkaline earth metal salts such as a calcium salt and a barium salt; a magnesium salt; an ammonium salt and the like, all of which can be used in the present invention. The cationic species forming the salt is not particularly limited, but an alkali metal salt is particularly preferable. These monoalkylarylsulfonic acid salt formalin condensates may be optionally used alone or in combination of two or more.

On the other hand, the polycarboxylic acid salt is not particularly limited except that the mass average molecular weight is limited to the range of 5,000 to 50,000, and includes, for example, a polyacrylic acid salt, a polymethacrylic acid salt, an acrylic acid/maleic acid copolymer, a styrene/maleic acid copolymer. The polycarboxylic acid salt includes an alkali metal salt such as a sodium salt and a potassium salt; an alkaline earth metal salts such as a calcium salt and a barium salt; a magnesium salt; an ammonium salt and the like, all of which can be used in the present invention. The cationic species forming the salt is not particularly limited, but an alkali metal salt is particularly preferable. The polycarboxylic acid salt of the present invention may be optionally used alone or in combination of two or more. Polycarboxylic acid salts differ greatly in properties depending on their molecular weight. Polycarboxylic acid salt which exerts remarkable surface activity has mass average molecular weight of 5,000 to 50,000. In the present specification, polycarboxylic acid salts corresponding to those having mass average molecular weight within the aforementioned range are considered as surfactants of the present invention, and polycarboxylic acid salts having mass average molecular weight outside the range are not considered to correspond to surfactants of the present invention. However, even a polycarboxylic acid salt having a mass average molecular weight outside such a range may be included as an optional component as long as the effect of the present invention is not impaired.

The compounding ratio of the component (B2) is generally in the range from 0.05 to 0.5% by mass, preferably from 0.07 to 0.2% by mass based on the total amount of the agrochemical composition. When the compounding ratio exceeds 0.5% by mass, an aggregate may generate in a dilute solution when blended with an agrochemical composition containing etofenprox. However, even if the compounding ratio of the component (B2) of the present invention exceeds 0.5% by mass, good performance shall be exhibited so long as the agrochemical composition of the present invention is used alone or in combination with an agrochemical composition containing an agrochemically active component other than etofenprox.

The compounding ratio of a surfactant in the present invention, that is, the total compounding ratio of the components (B1) and (B2) in total is preferably 1% by mass or less based on the total amount of the agrochemical composition. Too high compounding ratio of the surfactant may produce an aggregate in a dilute solution when blended with an agrochemical composition containing etofenprox.

An antifoaming agent may be compounded into the agrochemical composition of the present invention. Examples of the antifoaming agent that can be used in the present invention include silicone-based antifoaming agents typified by polyalkyl polysiloxane and polyphenyl polysiloxane; fatty acids and metal salts thereof typified by myristic acid and sodium stearate, and a known antifoaming agent may be optionally used alone or in combination of two or more.

In the case where the antifoaming agent is compounded into the agrochemical composition of the present invention, the compounding ratio is generally in the range from 0.01 to 0.5% by mass, preferably 0.02 to 0.2% by mass based on the total amount of the agrochemical composition. In the case where an antifoaming agent is compounded into the agrochemical composition of the present invention, the total compounding ratio with the component (B) is more preferably 1% by mass or less based on the total amount of the composition.

Moreover, auxiliary agents other than the antifoaming agent may also be compounded into the agrochemical composition of the present invention as desired. Examples of such an auxiliary agent which is an optional component include an antifreezing agent, a thickener, a preservatives a pH adjusting agent and the like, and known coloring matters such as Pigment Orange 16 or Blue No. 1 Dyes may be further added, if desired. Furthermore, when a spray solution is prepared so that an agrochemically active component shall be contained at high concentration, for example, in the case of aerial spraying, a polyacrylic acid salt having mass average molecular weight of less than 5,000 may be added in order to prevent formation of a hard cake in a spray solution.

Specific examples of the antifreezing agent include water-soluble substances having relatively low molecular weight typified by urea and common salt; water-soluble polyhydric alcohols typified by propylene glycol, ethylene glycol, diethylene glycol, glycerin, and the like, and a substance known as an antifreezing agent may be optionally used alone or in combination of two or more.

Specific examples of the thickener may include natural polysaccharides such as gum arabic, xanthan gum, guar gum, tamarind gum, pectin, and finely divided mineral matters such as white carbon, talc, bentonite, clay, and a substance known as a thickener may be optionally used alone or in combination of two or more.

Specific examples of the preservative include isothiazolin-3-one derivatives such as methylisothiazolinone, chloromethylisothiazolinone, benzoisothiazolinone; 2-bromo-2-propan-1,3-diol; bronopol; sorbic acid salt; paraben; benzoic acid or a salt thereof, and a substance known as a preservative may be optionally used alone or in combination of two or more.

Specific examples of the pH adjusting agent include acidic substances typified by sulfuric acid and potassium dihydrogen phosphate; basic substances typified by sodium hydroxide and calcium carbonate; a mixture of a weak acid and a conjugated base thereof, and a mixture of a weak base and a conjugated acid thereof exhibiting buffering capacity in an aqueous solution, and a substance known as a pH adjusting agent may be optionally used alone or in combination of two or more.

The agrochemical composition of the present invention does not require water-insoluble organic solvents such as benzene, toluene, xylene, ethylbenzene, styrene, kerosene, dichloromethane, chloroform, carbon tetrachloride, carbon disulfide, liquid paraffin, higher fatty acid, fatty acid ester, aromatic carboxylic acid esters. If a maker desires, a water-insoluble organic solvent may be added to the agrochemical composition of the present invention without problem in order to adjust specific gravity, but it is preferable not to blend the water-insoluble organic solvent in consideration of environmental burden and safety to users.

The agrochemical composition of the present invention may be prepared into any forms such as wettable powders, water-dispersible granules, aqueous suspension preparations and the like. Among them, the aqueous suspension preparation, i.e., a liquid agrochemical preparation wherein particulates of an agrochemically active component relatively insoluble in water are suspended in water, is a widely used form of preparation from the following reasons: there is no dusting at the time of use and there is less concern that the user is exposed to agrochemical preparations; it is easy to weigh; and it is highly safe because it does not use an organic solvent which has adverse effects on the human body and the environment and has low flash point, etc.

In the agrochemical composition of the present invention, water is further compounded as a dispersion medium of solid components including pyribencarb. The water herein may be of course pure water or distilled water but may contain trace amounts of agriculturally or industrially acceptable impurities. It is also possible to use drinking water such as mineral water or tap water, and agricultural or industrial water prepared by duly treating with groundwater or river water. Water also serves as an extender for an aqueous suspension agrochemical composition and its compounding ratio is not particularly limited, but when water is extremely insufficient relative to the amount of pyribencarb, the pyribencarb/water dispersion system in the aqueous suspension agrochemical composition may become unstable. Accordingly, it is preferable to blend water in an amount by mass equal to or more than that of pyribencarb. Although pyribencarb has not been put into practical use as an aqueous suspension preparation, the agrochemical composition of the present invention can be suitably prepared into an aqueous suspension preparation.

Generally speaking, in an aqueous suspension preparation, extremely low viscosity results in remarkable liquid phase separation during storage, whereas extremely high viscosity makes it difficult to discharge the composition from the bottle at the time of use. Therefore, in the case of the agrochemical composition of the present invention which is an aqueous suspension preparation, the preferred viscosity range of the agrochemical composition of the present invention where the liquid phase separation during storage is reduced and dischargeability from a bottle is good in the time of use is about 200 to 700 mPa·s, and more preferably about 250 to 650 mPa·s as measured using a B-type viscometer under measurement conditions at rotation number of 30 rpm at 20° C.

When the agrochemical composition of the present invention is water-dispersible powders or granules, it is prepared by further adding a solid carrier as an extender. As the solid carrier, clay, calcium carbonate, diatomaceous earth, bentonite, white carbon, sucrose, urea, potassium chloride, sodium sulfate and the like may be mentioned.

If desired, an additional agrochemically active component may be compounded into the agrochemical composition in addition to the aforementioned pyribencarb. The additional agrochemically active component may be used singly or in combination of two or more. Specific examples of the additional agrochemically active component will be listed below but are not limited thereto.

Herbicidal Component

Ioxynil, aclonifen, acrolein, azafenidin, acifluorfen (including a salt with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including a salt with amine or the like), imazapyr (including a salt with isopropylamine or the like), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobanzamid, endothal-disodium, oxadiazon, oxadiargyl, oxaziclomefone, oxyfluorfen, oryzalin, orthosulfamuron, orbencarb, cafenstrole, carfentrazone-ethyl, karbutilate, carbetamide, quizalofop-ethyl, quizalofop-P-ethyl, quizalofop-P-tefuryl, quinoclamine, quinclorac, quinmerac, cumyluron, clacyfos, glyphosate (including a salt with sodium, potassium, ammonium, amine, propylamine, isopropylamine, dimethylamine, trimesium or the like), glufosinate (including a salt with amine, sodium or the like), glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, saflufenacil, cyanazine, cyanamide, diuron, diethatyl-ethyl, dicamba (including a salt with amine, diethylamine, isopropylamine, diglycolamine, sodium, lithium or the like), cycloate, cycloxydim, diclosulam, cyclosulfamuron, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sethoxydim, terbacil, daimuron, dalapon, thiazopyr, tiafenacil, thiencarbazone (including a sodium salt, methyl ester or the like), tiocarbazil, thiobencarb, thidiazimin, thifensulfuron-methyl, desmedipham, desmetryne, thenylchlor, tebutam, tebuthiuron, tepraloxydim, tefuryltrione, tembotrione, terbuthylazine, terbutryn, terbumeton, topramezone, tralkoxydim, triaziflam, triasulfuron, triafamone, tri-allate, trietazine, triclopyr, triclopyr-butotyl, trifludimoxazin, tritosulfuron, triflusulfuron-methyl, trifluralin, trifloxysulfuron-sodium, tribenuron-methyl, tolpyralate, naptalam (including a salt with sodium or the like), naproanilide, napropamide, napropamide-M, neburon, norflorazon, vernolate, paraquat, halauxifen-methyl, haloxyfop, haloxyfop-P, haloxyfop-etotyl, halosulfuron-methyl, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, phenisopham, fenuron, fenoxasulfone, fenoxaprop-P-ethyl, fenquinotrione, fenthiaprop-ethyl, fentrazamide, phenmedipham, foramsulfuron, butachlor, butafenacil, butamifos, butylate, butenachlor, butralin, butroxydim, flazasulfuron, flamprop (including methyl ester, ethyl ester, isopropyl ester), flamprop-M (including methyl ester, ethyl ester, isopropyl ester), fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including an ester such as butyrate, octanoate, or heptanoate), bromofenoxim, bromobutide, florasulam, pethoxamid, benazolin, penoxsulam, heptamaloxyloglucan, beflubutamid, pebulate, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, mecoprop (including a salt such as sodium salt, potassium salt, isopropylamine salt, triethanolamine salt, dimethylamine salt, or the like), mecoprop-P-potassium, mesosulfuron-methyl mesotrione, metazachlor, metazosulfuron, methabenzthiazuron, metamitron, metamifop, methiozolin, methyldymuron, metoxuron, metosulam, metobromuron, metobenzuron, metolachlor, metribuzin, mefenacet, monolinuron, molinate, iodosulfuron, iodosulfulon-methyl-sodium, iofensulfuron, iofensulfuron-sodium, lactofen, linuron, lenacil, 2,3,6-TBA (2,3,6-trichlorobenzoic acid), 2,4,5-T(2,4,5-trichlorophenoxyacetic acid), 2,4-D (2,4-dichlorophenoxyacetic acid) (including a salt such as amine salt, diethylamine salt, triethanolamine salt, isopropylamine salt, sodium salt, lithium salt or the like), 2,4DB (4-(2,4-dichlorophenoxy)butyric acid), AE-F-150944 (Code Number), DNOC (4,6-dinitro-o-cresol) (including a salt such as amine salt, sodium salt or the like), EPTC (S-ethyldipropylthiocarbamate), MCPA (2-methyl-4-chlorophenoxyacetic acid), MCPA-thioethyl, MCPB (2-methyl-4-chlorophenoxybutyric acid) (including a sodium salt, an ethyl ester, or the like), SYP-298 (Code Number), SYP-300 (Code Number), S-metolachlor and TCA (2,2,2-trichloroacetic acid) (including a salt such as sodium salt, calcium salt, ammonia salt, or the like) are included.

Insecticidal Component

Acrinathrin, azadirachtin, azamethiphos, azinphos-ethyl, azinphos-methyl, acequinocyl, acetamiprid, acetoprole, acephate, azocyclotin, abamectin, afidopyropen, amidoflumet, amitraz, alanycarb, aldicarb, aldoxycarb, allethrin [including d-cis-trans-isomer, d-trans-isomer], isazophos, isamidofos, isocarbophos, isoxathion, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, ethoprophos, etrimfos, emamectin benzoate, endosulfan, empenthrin, oxamyl, oxydemeton-methyl, oxydeprofos, omethoate, cadusafos, kappa-tefluthrin, kappa-bifenthrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, cyanophos, diafenthiuron, dimidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefuran, dinobuton, cyhalothrin [including gamma-isomer, lambda-isomer], cyphenothrin [including (1R)-trans-isomer], cyfluthrin [including beta-isomer], diflubenzuron, cyflumetofen, diflovidazin, cyhexatin, cypermethrin [including alpha-isomer, beta-isomer, theta-isomer, zeta-isomer], dimethylvinphos, dimefluthrin, dimethoate, silafluofen, cyromazine, spinetoram, spinosad, spirodiclofen, spirotetramat, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, Verticillium lecanii, hydroprene, Pasteuriapenetrans spore (Pasteuriapenetrans) vamidothion, parathion, parathion-methyl, halfenprox, halofenozide, bioallethrin, bioallethrin S-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including (1R)-trans-isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazuron, fluensulfone, sodium fluoroacetate, flucycloxuron, flucythrinate, flusulfamide, fluvalinate [including tau-isomer], flupyradifurone, flupyrazofos, flufiprole, flufenerim, flufenoxystrobin, flufenoxuron, fluhexafon, flubendiamide, flumethrin, protrifenbute, prothiofos, flonicamid, propaphos, propargite, profenofos, broflanilide, profluthrin, propetamphos, propoxur, flometoquin, bromopropylate, hexythiazox, hexaflumuron, Paecilomyces tenuipes, Paecilomyces fumosoroceus, heptafluthrin, heptenophos, permethrin, benclothiaz, bensultap, benzoximate, bendiocarb, benfuracarb, Beauveria tenella, Beauveria bassiana, Beauveria brongniartii, phoxim, phosalone, fosthiazate, fosthietan, phosphamidon, phosmet, polynactin complex (polynactins), formetanate, phorate, malathion, milbemectin, mecarbam, mesulfenfos, methoprene, methomyl, metaflumizone, methamidophos, metam, methiocarb, methidathion, methyl isothiocyanate, methyl bromide, methoxychlor, methoxyfenozide, methothrin, metofluthrin, methoprene, metolcarb, mevinphos, meperfluthrin, Monacrosporium phymatophagum, monocrotophos, momfluorothrin, litlure-A, litlure-B, aluminium phosphide, zinc phosphide, hydrogen phosphide (phosphine), lufenuron, rescalure, resmethrin, lepimectin, rotenone, fenbutatin oxide, calcium cyanamide (calcium cyanide), nicotine sulfate, (Z)-11-tetradecenyl-acetate, (Z)-11-hexadecenal, (Z)-11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae*, *Bacillus subtillis*, *Bacillus sphaericus*, *Bacillus thuringiensis* subsp. *aizawai*, *Bacillus thuringiensis* subsp. *israelensis*, *Bacillus thuringiensis* subsp. *kurstaki*, *Bacillus thuringiensis* subsp. *tenebrionis*, Bt protein (Cry1Ab, Cry1Ac, Cry1Fa, Cry2Ab, mCry3A, Cry3Ab, Cry3Bb, Cry34/35Ab1), CL900167 (Code Number), DCIP (bis-(2-chloro-1-methylethyl)ether), DDT (1,1,1-trichloro-2,2-bis(4-chlorophenyl)ethane), DEP (dimethyl-2,2,2-trichloro-1-hydroxyethylphosphonate), DNOC (4,6-dinitro-o-cresol), DSP (O,O-diethyl-O-[4-(dimethylsulfamoyl)phenyl]-phosphorothioate), EPN (O-ethyl-O-4-(nitrophenyl)phenylphosphorothioate, nuclear polyhedrosis visur occlusion body, NA-85 (Code Number), NA-89 (Code Number), NC-515 (Code Number), RU15525 (Code Number), ZDI-2501 (Code Number), XMC, Z-13-icosen-10-one, ZXI8901 (Code Number) and ME5382 are included.

Antibacterial Component

Azaconazole, acibenzolar-S-methyl, azoxystrobin, anilazine, amisulbrom, ametoctradin, aldimorph, isotianil, isopyrazam, isofetamid, isoprothiolane, ipconazole, iprodione, iprovalicarb, iprobenfos, imazalil, iminoctadine albesilate (iminoctadine-trialbesilate), iminoctadine-triacetate, imibenconazole, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxyquinoline copper (oxine-copper), oxytetracycline, oxpoconazole-fumarate, oxolinic acid, copper octanoate (copper dioctanoate), octhilinone, ofurace, orysastrobin, o-phenylphenol, kasugamycin, captafol, carpropamid, carbendazim, carboxin, carvone, quinoxyfen, chinomethionat, captan, quinconazole, quintozene, guazatine, culfraneb, coumoxystrobin, kresoxim-methyl, clozylacon, chlozolinate, chlorothalonil, chloroneb, cyazofamid, diethofencarb, diclocymet, dichlofluanid, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, bitertanol, binapacryl, biphenyl, piperalin, hymexazol, pyraoxystrobin, pyraclostrobin, pyraziflumid, pyrazophos, pyrametostrobin, pyriofenone, pyrisoxazole, pyrifenox, pyributicarb, pyrimethanil, pyroquilon, vinclozolin, ferbam, famoxadone, phenazine oxide, fenamidone, fenaminstrobin, fenarimol, fenoxanil, ferimzone, fenpiclonil, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluoxastrobin, fluopicolide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (aluminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metconazole, metominostrobin, metrafenone, mepanipyrim, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-dichloroisothiazol-5-yl)methyl 4-(tert-butyl)benzoate (Chemical Name, CAS Registered Number: 1231214-23-5), 3-((3,4-dichloroisothiazol-5-yl)methoxy)benzo[d]isothiazol-1,1-dioxide (Chemical Name, CAS Registered Number: 957144-77-3), BAF-045 (Code Number), BAG-010 (Code Number), DBEDC (dodecylbenzenesulfonic acid bisethylenediamine copper complex salt [II]), MIF-1002 (Code Number), TPTA (fentin acetate), TPTC (triphenyltin chloride) TPTH (triphenyltin hydroxide) and nonpathogenic *Erwinia carotovora* are included.

Active Component for Plant Growth Regulation

1-Methylcyclopropene, 1-naphthylacetamide, 2,6-diisopropylnaphthalene, 4-CPA (4-chlorophenoxyacetic acid), benzylaminepurine, ancymidol, aviglycine, carvone, chlormequat, cloprop, cloxyfonac, cloxyfonac-potassium, cyclanilide, cytokinins, daminozide, dikegulac, dimethipin, ethephon, epocholeone, ethychlozate, flumetralin, flurenol, flurprimidol, forchlorfenuron, gibberellins, inabenfide, indole acetic acid, indole butyric acid, maleic hydrazide, mefluidide, mepiquat chloride, n-decanol, paclobutrazol, prohexadione-calcium, prohydrojasmon, sintofen, thidiazuron, triacontanel, trinexapac-ethyl, uniconazole, uniconazole-P, -4-(24-oxo-phenylethyl)aminobutyric acid (Chemical Name, CAS Registered Number: 1083-55-2) and calcium peroxide are included.

When an additional agrochemically active component is compounded in addition to the pyribencarb into the agrochemical composition of the present invention, the compounding ratio of the agrochemically active components including the pyribencarb is not particularly limited, but it is usually 10 to 50% by mass, preferably 15 to 45% by mass, based on the total amount of the agrochemical composition.

In addition, a phytotoxicity reducing agent may be blended into the agrochemical composition of the present invention, if desired. Specific examples of the phytotoxicity reducing agents that can be blended will be listed below, but the present invention is not construed to be limited to these phytotoxicity reducing agents.

Phytotoxicity Reducing Agent

Isoxadifen, isoxadifen-ethyl, oxabetrinil, cloquintcet-mexyl, cyometrinil, dichlormid, dicyclonone, cyprosulfamide, 1,8-naphthalic anhydride, fenchlorazole-ethyl, fenclorim, furilazole, fluxofenim, flurazole, benoxacor, mefenpyr, mefenpyr-ethyl, mefenpyr-diethyl, lower alkyl-substituted benzoic acid, AD-67 (4-dichloroacetyl-1-oxa-4-azaspiro [4, 5]decane), DKA-24 (N1,N2-diallyl-N2-dichloroacetylglycinamide), MG-191 (2-dichloromethyl-2-methyl-1,3-dioxane), MON4660 (Code Number), N-(2-methoxybenzoyl)-4-[(methylaminocarbonyl)amino] benzenesulfonamide (Chemical Name, CAS Registered Number: 129531-12-0), PPG-1292 (2,2-dichloro-N-(1,3-dioxan-2-ylmethyl)-N-(2-propenyl)acetamide), R-29148 (3-dichloroacetyl-2,2,5-trimethyl-1,3-oxazolidine) and TI-35 (Code Number) are included.

The phytotoxicity reducing agent may be used alone or in combination of two or more. When these phototoxicity reducing agents are blended in the agrochemical composition of the present invention, the blending ratio of phototoxicity reducing agent is not particularly limited, but it is usually 1 to 40% by mass, preferably 2 to 30% by mass, more preferably 3 to 20% by mass, based on the total amount of the agrochemical composition.

As the pyribencarb and additional agrochemically active components, a pure product or a technical product may be directly used. Alternatively, they may be used in the form of reservoir type microcapsules containing the agrochemically active components coated with wall materials or in the form of monolithic type microcapsules in which the agrochemically active components are dispersed in the core of matrix. Application of formulation pretreatment technique of agrochemically active component is not particularly limited and known methods and materials may be optionally used as desired.

The amount of the agrochemical composition of the present invention to be applied varies depending on the forms of the preparations, the target disease, occurrence tendency, extent of damage, environmental conditions, etc. For example, it may be appropriately selected so that the amount of pyribencarb should be in the range of 1 to 10,000 g/ha, preferably 10 to 1,000 g/ha. The agrochemical composition of the present invention can control plant diseases caused by fungi belonging to Oomycota, Ascomycota, Basidiomycota, and Deuteromycota according to the above application embodiment. Specific plant pathogenic bacteria that can be controlled will be listed below but are not limited to them.

Plant Pathogenic Microbe

Pseudoperonospora such as Pseudoperonospora cubensis; Venturia such as Venturia inaequalis; Erysiphe such as Erysiphe graminis; Pyricularia such as Pyricularia oryzae; Botrytis such as Botrytis cinerea; Rhizoctonia such as Rhizoctonia solani; Puccinia such as Puccinia recondita; Septoria such as Septoria nodorum; Sclerotinia such as Sclerotinia sclerotiorum; and Cercospora such as Cercospora kikuchii are included.

In a preferred method for producing the agrochemical composition of the present invention, a lignin sulfonic acid salt is purified to obtain the component (B1), that is, a lignin sulfonic acid salt having purity of 85% by mass or more wherein the content of reducing sugars is less than 5% by mass and the content of sugar sulfonic acids is less than 6% by mass, which is to be used. Purification of a lignin sulfonic acid salt may be carried out by a known method, for example, pH control, ion exchange, ultrafiltration, size exclusion chromatography or the like.

Examples of a typical production method of the aqueous suspension preparation which is the agrochemical composition of the present invention include a method wherein the pyribencarb, the surfactant acceptable in the present invention, water and optionally other optional components such as an antifoaming agent, each in a predetermined amount, are mixed, wet-pulverized and stirred, at high speed with a grinding medium such as glass beads, ceramic beads, stainless steel beads or the like to obtain an agrochemical composition. Alternatively, for the purpose of, for example, improving the efficiency of the pulverization step, all of the pyribencarb and a part of the remaining raw materials are mixed and wet-pulverized to produce slurry of the pyribencarb, subsequently the remaining raw materials may be added to the slurry and mixed to obtain an agrochemical composition. Alternatively, an agrochemical composition may also be obtained by a method wherein the pyribencarb may be dry-pulverized using means such as impact pulverization, air flow pulverization or the like, and the dry-pulverized pyribencarb may be added and dispersed in a liquid mixture containing the surfactant acceptable in the present invention, water and other optional component if desired, each in a predetermined amount.

Examples of a typical production method of the wettable powders which is the agrochemical composition of the present invention include, a method wherein the pyribencarb, the surfactant acceptable in the present invention, a solid carrier and, if desired, other optional components such as an antifoaming agent, each in a predetermined amount, are mixed, dry-pulverized by means of impact pulverization, air-flow pulverization or the like to obtain an agrochemical composition. Alternatively, for the propose of, for example, improving the efficiency of the pulverization step, all of the pyribencarb and a part of the remaining raw materials are mixed and dry-pulverized to produce a premix of the pyribencarb, subsequently the remaining raw materials may be added and mixed with the premix to obtain an agrochemical composition.

Examples of a typical production method of the water-dispersible granules which is the agrochemical composition of the present invention include a method wherein the pyribencarb, the aforementioned surfactant acceptable in the present invention, a solid carrier and, if desired, other optional components such as an antifoaming agent, each in a predetermined amount, are mixed, dry-pulverized by means of impact pulverization, air-flow pulverization or the like, and the dry-pulverized raw material mixture is directly granulated by compression molding or kneaded with a predetermined amount of water added thereto and subject to agitation granulation, fluidized bed granulation or extruding granulation, and dried to obtain an agrochemical composition. Again, for the purpose of, for example, improving the efficiency of the pulverization step, all of the pyribencarb and a part of the remaining raw materials are mixed and dry-pulverized to produce a premix of the pyribencarb, subsequently the remaining raw materials may be added to the premix and mixed to obtain an agrochemical composition. Alternatively, all of the pyribencarb, all or a part of the remaining raw materials, and water are mixed and wet-pulverized to produce slurry of the pyribencarb, subsequently the remaining raw materials, if any, may be added to the slurry and mixed, and water is removed by spray drying to obtain an agrochemical composition.

Whichever production method is employed, it is preferred to finely pulverize the pyribencarb in order to attain favorable dispersion of the pyribencarb in an agrochemical composition or in a spray solution obtained by diluting the composition during the preparation at the time of use. The particle size of the pyribencarb particles attained during the pulverization step is preferably from about 0.2 to 10 μm, more preferably from about 0.5 to 6 μm as volume average particle size. If the size of a pyribencarb particle in an agrochemical composition exceeds 10 μm, pyribencarb particles precipitate quickly in a spray solution, possibly resulting in difficulty in obtaining a uniform spray solution. Moreover, when the agrochemical composition is an aqueous suspension preparation, there is concern over the liquid phase separation during storage becoming remarkable. The volume average particle size of the pyribencarb particles can be measured, for example, by a laser diffraction method and a measuring apparatus using this method as a measuring principle.

The agrochemical composition of the present invention produced in this manner may be used singly without problem and exhibits the desired disease controlling effect as an agrochemical preparation containing the pyribencarb. However, the agrochemical composition of the present invention exerts its true value when used in combination with other agrochemical compositions, especially an agrochemical composition containing etofenprox. That is, the technical product of the pyribencarb and the conventional agrochemical composition containing the pyribencarb cause aggregates when blended with an agrochemical composition containing etofenprox, and such aggregates clog a strainer and/or nozzle in a spraying device, resulting in difficulty in spraying. Meanwhile the agrochemical composition of the present invention does not cause such aggregates even when used in combination with an agrochemical composition containing the etofenprox, which is preferably used and enables blend spraying being carried out without problem.

A mixed agrochemical preparation of the present invention which can be used for the blend spraying is a mixed agrochemical preparation which is a mixture of the agrochemical composition of the present invention and an agrochemical composition containing etofenprox, characterized in that the compounding ratio of the lignin sulfonic acid salt having purity of 85% by mass or more wherein the content of the reducing sugars is less than 5% by mass and the content of the sugar sulfonic acids is less than 6% by mass (B1) is 0.1 to 0.9% by mass, and in that the compounding ratio of the monoalkylarylsulfonic acid salt formalin condensate and/or a polycarboxylic acid salt having mass average molecular weight of 5,000 to 50,000 (B2) is 0.05 to 0.5% by mass.

The form of other agrochemical compositions that can be used for blend spraying with the agrochemical composition of the present invention is not particularly limited, but those prepared as liquid agrochemical preparations are preferred. Examples of agrochemically active components included in other agrochemical compositions include, in addition to the etofenprox, the additional agrochemically active components described above. The compounding ratio of the agrochemically active component contained in other agrochemical composition is usually in the range of 0.005 to 20% by mass based on the total amount of the agrochemical composition.

Specific examples of an agrochemical composition containing the etofenprox include, for example, liquid agrochemical compositions such as EARTH GARDEN T (Trade name of EARTH CORPORATION), AMISTAR® TREBON® SE (Trade name of KYOYU AGRI), KASURAB TREBON SOL (Trade name of HOKKO CHEMICAL INDUSTRY), SUNNY FIELD® MC (Trade name of NISSAN CHEMICAL INDUSTRIES), SUNNY FIELD® EC (Trade name of NISSAN CHEMICAL INDUSTRIES), SANYOL-TREBON SPRAY (Trade name of YONEZAWA CHEMICAL), SUMITHIONE TREBON EC (Trade name of KYOYU AGRI), DOUBLE CUT® TREBON FLOWABLE (Trade name of HOKKO CHEMICAL INDUSTRY), TOPJIN TREBON FLOWABLE (Trade name of HOKKO CHEMICAL INDUSTRY), TREBON® EW (Trade name of MITSUI CHEMICAL AGRO), TREBON® MC (Trade name of MITSUI CHEMICAL AGRO), TREBON® AIR (Trade name of MITSUI CHEMICAL AGRO), TREBON SKY® MC (Trade name of MITSUI CHEMICAL AGRO), TREBON® STAR® FLOWABLE (Trade name of MITSUI CHEMICAL AGRO), TREBON® EC (Trade name of MITSUI CHEMICAL AGRO), BEAM™ EIGHT TREBON SOL (Trade name of SUMITOMO CHEMICAL), MANAGE TREBON FLOWABLE (Trade name of HOKKO CHEMICAL INDUSTRY), LOVESIDE TREBON SOL (Trade name of HOKKO CHEMICAL INDUSTRY), LOVESIDE TREBON SOL 17 (Trade name of HOKKO CHEMICAL INDUSTRY), LOVESIDE TREBON FLOWABLE (Trade name of HOKUSAN). There are solid agrochemical compositions such as a dusts containing etofenprox, but liquid agrochemical compositions are preferable.

A method for spraying mixed agrochemicals according to the present invention includes spraying a spray solution of mixed agrochemicals onto agricultural land or non-agricultural land, the spray solution being prepared by diluting the agrochemical composition of the present invention (hereinafter also referred to as an "agrochemical preparation of the present invention") and an agrochemical composition containing etofenprox (hereinafter also referred to as an "agrochemical preparation containing etofenprox") in water for spraying.

A method for diluting each composition in water for spraying according to the present invention is not particularly limited and includes a method wherein the agrochemical preparation of the present invention is firstly poured into water for spraying followed by an agrochemical preparation containing etofenprox; a method wherein an agrochemical preparation containing etofenprox is firstly poured into water for spraying followed by the agrochemical preparation of the present invention, and a method wherein both agrochemical preparations are simultaneously poured, any of which may be employed. Alternatively, each agrochemical preparation may be separately diluted in a small amount of water for spraying before being poured into water for spraying. Furthermore, each agrochemical preparation, which has been diluted in water for spraying, is optionally mixed and additional water for spraying is added to a predetermined amount.

A device for spraying agrochemicals which can be used for blend spraying according to the present invention includes a boom sprayer, a speed sprayer, a sprinkler and the like can be exemplified, but any device for spraying agrochemicals known for this usage may be arbitrarily used without particular limitation.

The embodiments of the methods for blend spraying according to the present invention are roughly divided into: ground spraying using the aforementioned device for spraying agrochemicals; and aerial spraying from the air using an aircraft such as a fixed wing aircraft or a rotary wing aircraft, equipped with the aforementioned device for spraying agrochemicals.

The amount of a spray solution of blended agrochemicals to be sprayed according to the present invention is usually about 300 to 50,000 L/ha in the case of ground spraying. Meanwhile, the amount of a spray solution in the case of aerial spraying is usually about 1 to 150 L/ha, more typically about 8 to 32 L/ha, which is remarkably small since the amount of spray solution that can be loaded on an aircraft may be inevitably restricted by the load capacity of the aircraft determined by its power performance or the like. Therefore, in blended application in the case of aerial spraying, a diluted solution is prepared by mixing a plurality of agrochemical compositions at high concentration. Specifically, in aerial spraying, the agrochemical composition is diluted at high concentration expressed as dilution factor up to about 2 to 150 times, typically about 3 to 40 times, and more typically about 4 to 32 times to prepare a spray solution. On the other hand, the dilution factor of each agrochemical composition in ground-spraying is about 500 to 4000 times.

As mentioned above, aerial spraying is advantageous in that it can enable agrochemical treatment in a labor-saving manner on a wide area of agricultural land, etc., although the amount of spray solution may be limited compared with the case of ground spraying. However, in aerial spraying which employs a spray solution wherein agrochemical composition is mixed at significantly higher concentration than in that ground spraying, it is remarkable that blending the incompatible agrochemical compositions has adverse effect. However, the agrochemical composition of the present invention does not produce such aggregates even if blended with other agrochemical compositions, especially an agrochemical composition containing etofenprox, at a high concentration as mentioned above. Therefore, it can be suitably used and enables blend spraying without problem even in the case of aerial spraying.

A suitable method for blend spraying according to the present invention in the case of aerial spraying will be hereinafter described in detail. The method for blend spraying according to the present invention is characterized in that the agrochemical preparation of the present invention and other agrochemical compositions (also referred to as "other agrochemical preparations"), particularly an agrochemical formulation containing etofenprox, are diluted in a predetermined amount of the same water for spraying to the volume 4 to 32 times the volume of the agrochemical preparation of the present invention and to the volume 4 to 32 times the volume of the agrochemical preparation containing etofenprox, and thus prepared spray solution of blended agrochemicals is sprayed by aerial spraying onto agricultural land or non-agricultural land from an aircraft having agrochemical spraying function in an amount of 8 to 32 L/ha. For example, the spray solution of mixed agrochemicals is charged in a chemical tank mounted on the aircraft, and the spray solution is aerially sprayed in an amount of 8 to 32 L/ha while the aircraft is flying over the agricultural land or non-agricultural land.

Examples of the aircraft which can be used for the combined spraying method of the present invention include a fixed wing aircraft such as a small light aircraft so-called Cessna plane, a rotary wing aircraft such as a manned helicopter or an unmanned helicopter, and tilt rotor aircraft that combines both characteristics. In particular, a small unmanned helicopter specialized for spraying agrochemicals can be suitably used. However, any aircraft known for such usage may be optionally used without limitation.

In the case of aerial spraying, wherein an agrochemical solution for spraying is prepared at high concentration, it is preferable that the agrochemical composition of the present invention is an aqueous suspension preparation while the other agrochemical composition is a liquid agrochemical composition because no solid such as solid carrier is contained that may cause precipitation or the like in the agrochemical solution for spraying.

Among the aforementioned liquid agrochemical compositions containing etofenprox, AMISTAR® TREBON® SE (Trade name of KYOYU AGRI), KASURAB TREBON SOL (Trade name of HOKKO CHEMICAL INDUSTRY), SUMITHIONE TREBON EC (Trade name of KYOYU AGRI), DOUBLE CUT® TREBON FLOWABLE (Trade name of HOKKO CHEMICAL INDUSTRY), TOPJIN TREBON FLOWABLE (Trade name of HOKKO CHEMICAL INDUSTRY), TREBON® AIR (Trade name of MITSUI CHEMICAL AGRO), TREBON SKY® MC (Trade name of MITSUI CHEMICAL AGRO), TREBON STAR® FLOWABLE (Trade name of MITSUI CHEMICAL AGRO), BEAM™ EIGHT TREBON® SOL (Trade name of SUMITOMO CHEMICAL), MANAGE TREBON FLOWABLE (Trade name of HOKKO CHEMICAL INDUSTRY), LOVESIDE TREBON SOL (Trade name of HOKKO CHEMICAL INDUSTRY), LOVESIDE TREBON SOL 17 (Trade name of HOKKO CHEMICAL INDUSTRY), LOVESIDE TREBON FLOWABLE (Trade name of HOKUSAN) are commercially available as agrochemical preparations for aerial spraying. Some of the aforementioned agrochemical preparations for aerial spraying may also be used for ground spraying, i.e., may be agrochemical preparations both for aerial spraying and ground spraying. In the present specification, however, all agrochemical preparations are described as agrochemical preparations for aerial spraying. “Agrochemical preparation for aerial spraying” used herein refers to, in Japan, an agrochemical preparation which is registered to be used by “aerial spraying” or by “spraying with an unmanned helicopter” as usage restricted by Agrochemicals Regulation Law, and such usage is described on an agrochemical label.

Moreover, in the case of aerial spraying, among the additional agrochemically active components described above, MCPB, azimsulfuron, imazosulfuron, etobenzamid, oxaziclomefone, cafenstrole, carfentrazone-ethyl, glyphosate isopropylamine salt, glyphosate potassium salt, glufosinate-P-sodium, clomeprop, cyhalofop-butyl, dimethametryn, simetryn, daimuron, tefuryltrione, halosulfuron-methyl, pyraclonil, pyrazoxyfen, pyrazosulfuron-ethyl, pyrazolynate, pyriftalid, pyributicarb, pyrimisulfan, pyriminobac-methyl, fentrazamide, flucetosulfuron, pretilachlor, propyrisulfuron, bromobutide, penoxsulam, bensulfuron-methyl, benzobicyclon, benzofenap, pentoxazone, benfuresate, mesotrione, metazosulfuron, mefenacet, molinate, fenitrothion, acetamiprid, acephate, imidacloprid, indoxacarb, ethiprole, clothianidin, chromafenozide, chlorantraniliprole, dinotefuran, cypermethrin, silafluofen, thiacloprid, thiamethoxam, thiodicarb, tebufenozide, teflubenzuron, pyridalyl, buprofezin, flubendiamide, permethrin, methoxyfenozide, nuclear polyhedrosis virus occlusion body, chlorothalonil, azoxystrobin, isoprothiolane, iminoctadine-albesilate (iminoctadine-trialbesilate), iminoctadine-acetate (iminoctadine-triacetate), imibenconazole, kasugamycin, cyazofamid, diclocymet, simeconazole, cymoxanil, thiophanate-methyl, tetraconazole, tebuconazole, tricyclazole, tolclofos-methyl, *Bacillus subtilis*, validamycin, pyroquilon, famoxadone, fenoxanil, ferimzone, phthalide, furametpyr, flutolanil, procymidone, propiconazole, probenazole, pencycuron, mancozeb, metalaxyl, metconazole, metominostrobin, mepronil, nonpathogenic *Erwinia carotovora*, calcium peroxide, trinexapac-ethyl, paclobutrazol, and prohexadione-calcium are preferably used because they have proven track record as practical agrochemical preparations for aerial spraying and may be added to the agrochemical composition of the present invention with good compatibility when the composition is used for aerial spraying.

EXAMPLES

The present invention will be described in detail in Examples. The present invention is not intended to be limited to these Examples. In the following Examples, parts mean parts by mass.

Example 1

Pyribencarb (18.8 parts), calcium lignin sulfonate having purity of 92% by mass (containing 3% by mass of reducing sugars, 4% by mass of sugar sulfonic acids, 1% by mass of inorganic salts as impurities, 0.63 parts), sodium butylnaphthalenesulfonate formalin condensate (0.25 parts) polyalkyl polysiloxane (0.1 parts), propylene glycol (10 parts), xanthan gum (0.28 parts) and water (69.94 parts) were mixed and wet-pulverized to prepare an agrochemical composition (aqueous suspension preparation) of the present invention containing 18.8% by mass of pyribencarb.

Example 2

Pyribencarb (18.8 parts), calcium lignin sulfonate having purity of 92% by mass (containing 3% by mass of reducing sugars, 4% by mass of sugar sulfonic acids, 1% by mass of inorganic salts as impurities, 0.63 parts), sodium butylnaphthalenesulfonate formalin condensate (0.25 parts), polyalkyl polysiloxane (0.1 parts), propylene glycol (10 parts), xanthan gum (0.28 parts), sodium polyacrylate having mass average molecular weight of about 4,000 (0.5 parts) and water (69.44 parts) were mixed and wet-pulverized to prepare an agrochemical composition (aqueous suspension preparation) of the present invention containing 18.8% by mass of pyribencarb.

Example 3

Pyribencarb (18.8 parts), partially desulfonated sodium lignin sulfonate having purity of 91% by mass (containing 9% by mass of inorganic salts as impurities, 0.63 parts), sodium butylnaphthalenesulfonate formalin condensate (0.25 parts), polyalkyl polysiloxane (0.1 parts), propylene glycol (10 parts), xanthan gum (0.28 parts), sodium polyacrylate having mass average molecular weight of about 4,000 (0.5 parts) and water (69.44 parts) were mixed and wet-pulverized to prepare an agrochemical composition (aqueous suspension preparation) of the present invention containing 18.8% by mass of pyribencarb.

Example 4

Pyribencarb (18.8 parts), sodium lignin sulfonate having purity of 92% by mass (containing 3% by mass of reducing sugars, 3% by mass of sugar sulfonic acids, 2% by mass of inorganic salts as impurities, 0.63 parts), sodium butylnaphthalenesulfonate formalin condensate (0.25 parts) polyalkyl polysiloxane (0.1 parts), propylene glycol (10 parts), xanthan gum (0.28 parts), sodium polyacrylate having mass average molecular weight of about 4,000 (0.5 parts) and water (69.44 parts) were mixed and wet-pulverized to prepare an agrochemical composition (aqueous suspension preparation) of the present invention containing 18.8% by mass of pyribencarb.

Example 5

Pyribencarb (18.8 parts), modified sodium lignin sulfonate having purity of 90% by mass (containing 5% by mass of sugar sulfonic acids, 5% by mass of inorganic salts as impurities, 0.63 parts), sodium butylnaphthalenesulfonate formalin condensate (0.25 parts), polyalkyl polysiloxane (0.1 parts), propylene glycol (10 parts), xanthan gum (0.28 parts), sodium polyacrylate having mass average molecular weight of about 4,000 (0.5 parts) and water (69.44 parts) were mixed and wet-pulverized to prepare an agrochemical composition (aqueous suspension preparation) of the present invention containing 18.8% by mass of pyribencarb.

Example 6

Pyribencarb (18.8 parts), calcium lignin sulfonate having purity of 92% by mass (containing 4% by mass of reducing sugars, 3% by mass of sugar sulfonic acids, 1% by mass of inorganic salts as impurities, 0.63 parts), styrene/sodium maleate copolymer having mass average molecular weight of 7,000 to 8,000 (0.08 parts), polyalkyl polysiloxane (0.1 parts), propylene glycol (10 parts), xanthan gum (0.28 parts), sodium polyacrylate having mass average molecular weight of about 4,000 (0.5 parts) and water (69.61 parts) were mixed and wet-pulverized to prepare an agrochemical composition (aqueous suspension preparation) of the present invention containing 18.8% by mass of pyribencarb.

Example 7

Pyribencarb (18.8 parts), partially desulfonated sodium lignin sulfonate having purity of 91% by mass (containing 9% by mass of inorganic salts as impurities, 0.63 parts), styrene/sodium maleate copolymer having mass average molecular weight of 7,000 to 8,000 (0.08 parts), polyalkyl polysiloxane (0.1 parts), propylene glycol (10 parts), xanthan gum (0.28 parts), sodium polyacrylate having mass average molecular weight of about 4,000 (0.5 parts) and water (69.61 parts) were mixed and wet-pulverized to prepare an agrochemical composition (aqueous suspension preparation) of the present invention containing 18.8% by mass of pyribencarb.

Example 8

Pyribencarb (18.8 parts), calcium lignin sulfonate having purity of 92% by mass (containing 4% by mass of reducing sugars, 3% by mass of sugar sulfonic acids, 1% by mass of inorganic salts as impurities, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (69.59 parts) were mixed and wet-pulverized to prepare an agrochemical composition (aqueous suspension preparation) of the present invention containing 18.8% by mass of pyribencarb.

Example 9

Pyribencarb (18.8 parts), calcium lignin sulfonate having purity of 92% by mass (containing 4% by mass of reducing sugars, 3% by mass of sugar sulfonic acids, 1% by mass of inorganic salts as impurities, 0.63 parts), sodium polyacrylate having mass average molecular weight of about 10,000 (0.11 parts), polyalkyl polysiloxane (0.1 parts), propylene glycol (10 parts), xanthan gum (0.28 parts), sodium polyacrylate having mass average molecular weight of about 4,000 (0.5 parts) and water (69.58 parts) were mixed and wet-pulverized to prepare an agrochemical composition (aqueous suspension preparation) of the present invention containing 18.8% by mass of pyribencarb.

Example 10

Pyribencarb (18.8 parts), sodium lignin sulfonate having purity of 86.2% by mass (containing 5.3% by mass of sugar sulfonic acids, 8.5% by mass of inorganic salts as impurities, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (69.59 parts) were mixed and wet-pulverized to prepare an agrochemical composition (aqueous suspension preparation) of the present invention containing 18.8% by mass of pyribencarb.

Example 11

Pyribencarb (18.8 parts), sodium lignin sulfonate having purity of 92% by mass (containing 1% by mass of reducing sugars, 7% by mass of inorganic salts as impurities, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4.000 (0.5 parts) and water (69.59 parts) were mixed and wet-pulverized to prepare an agrochemical composition (aqueous suspension preparation) of the present invention containing 18.8% by mass of pyribencarb.

Comparative Example 1

Pyribencarb (18.8 parts), polyoxyethylenetristyrylphenyl ether phosphate potassium salt (10 parts), a polyoxyethylene/polyoxypropylene block copolymer (2 parts), polyalkyl polysiloxane (0.1 parts), propylene glycol (1.0 parts), xanthan gum (0.28 parts) and water (58.32 parts) were mixed and wet-pulverized to prepare an agrochemical composition (aqueous suspension preparation) containing 18.8% by mass of pyribencarb.

Comparative Example 2

Pyribencarb (18.8 parts), polyoxyethylenetristyrylphenyl ether phosphate potassium salt (10 parts), a polyoxyethylene/polyoxypropylene block copolymer (2 parts), polyalkyl polysiloxane (0.1 parts), propylene glycol (10 parts), xanthan gam (0.28 parts), sodium polyacrylate having mass average molecular weight of about 4,000 (0.5 parts) and water (58.32 parts) were mixed and wet-pulverized to prepare an agrochemical composition (aqueous suspension preparation) containing 18.8% by mass of pyribencarb.

Comparative Example 3

Pyribencarb (18.8 parts), sodium methylnaphthalenesulfonate formalin condensate (0.13 parts), polyoxyethylenetristyrylphenyl ether phosphate ammonium salt (0.5 parts), polyoxyalkylene glycol (0.5 parts), polyalkyl polysiloxane (0.1 parts), propylene glycol (10 parts), xanthan gum (0.28 parts), sodium polyacrylate having mass average molecular weight of about 4,000 (0.5 parts) and water (69.19 parts) were mixed and wet-pulverized to prepare an agrochemical composition (aqueous suspension preparation) containing 18.8% by mass of pyribencarb.

Comparative Example 4

Pyribencarb (18.8 parts), polyoxyethylenestyrylphenyl ether sulfate sodium salt (0.94 parts), polyoxyethylenestyrylphenyl ether (0.94 parts), sodium dodecylbenzenesulfonate (0.1 parts), polyalkyl polysiloxane (0.1 parts), propylene glycol (1.0 parts), xanthan gum (0.28 parts), sodium polyacrylate having mass average molecular weight of about 4,000 (0.5 parts) and water (68.34 parts) were mixed and wet-pulverized to prepare an agrochemical composition (aqueous suspension preparation) containing 18.8% by mass of pyribencarb.

Comparative Example 5

Pyribencarb (18.8 parts), calcium lignin sulfonate having purity of 92% by mass (containing 3% by mass of reducing sugars, 4% by mass of sugar sulfonic acids, 1% by mass of inorganic salts as impurities, 0.63 parts), sodium butylnaphthalenesulfonate formalin condensate (0.25 parts), polyoxyethylenetristyrylphenyl ether ammonium sulfate (1 part), polyoxyalkylene glycol (1 part), polyalkyl polysiloxane (0.1 parts), propylene glycol (10 parts), xanthan gum (0.28 parts), sodium polyacrylate having mass average molecular weight of about 4,000 (0.5 parts) and water (67.44 parts) were mixed and wet-pulverized to prepare an agrochemical composition (aqueous suspension preparation) containing 18.8% by mass of pyribencarb.

Comparative Example 6

Pyribencarb (18.8 parts), calcium lignin sulfonate having purity of 92% by mass (containing 3% by mass of reducing sugars, 4% by mass of sugar sulfonic acids, 1% by mass of inorganic salts as impurities, 0.63 parts), sodium butylnaphthalenesulfonate formalin condensate (0.25 parts), fatty acid sodium salt (1 part), polyalkyl polysiloxane (0.1 parts), propylene glycol (10 parts), xanthan gum (0.28 parts), sodium polyacrylate having mass average molecular weight of about 4,000 (0.5 parts) and water (68.44 parts) were mixed and wet-pulverized to prepare an agrochemical composition (aqueous suspension preparation) containing 18.8% by mass of pyribencarb.

Comparative Example 7

Pyribencarb (18.8 parts), calcium lignin sulfonate having purity of 92% by mass (containing 3% by mass of reducing sugars, 4% by mass of sugar sulfonic acids, 1% by mass of inorganic salts as impurities, 0.63 parts), sodium naphthalenesulfonate formalin condensate (0.25 parts), polyalkyl polysiloxane (0.1 parts), propylene glycol (10 parts), xanthan gum (0.28 parts), sodium polyacrylate having mass average molecular weight of about 4,000 (0.5 parts) and water (69.44 parts) were mixed and wet-pulverized to prepare an agrochemical composition (aqueous suspension-preparation) containing 18.8% by mass of pyribencarb.

Comparative Example 8

Pyribencarb (18.8 parts), sodium polyacrylate having mass average molecular weight of about 38,000 (0.1 parts), sodium dibultylnaphthalenesulfonate formalin condensate (0.44 parts), polyalkyl polysiloxane (0.1 parts), propylene glycol (10 parts), xanthan gum (0.28 parts), sodium polyacrylate having mass average molecular weight of about 4,000 (0.5 parts) and water (69.78 parts) were mixed and wet-pulverized to prepare an agrochemical composition (aqueous suspension preparation) containing 18.8% by mass of pyribencarb.

Comparative Example 9

Pyribencarb (18.8 parts), sodium polyacrylate having mass average molecular weight of about 10,000 (0.11 parts), sodium dibutylnaphthalenesulfonate formalin condensate (0.44 parts), polyalkyl polysiloxane (0.1 parts), propylene glycol (10 parts), xanthan gum (0.28 parts), sodium polyacrylate having mass average molecular weight of about 4,000 (0.5 parts) and water (69.77 parts) were mixed and wet-pulverized to prepare an agrochemical composition (aqueous suspension preparation) containing 18.8% by mass of pyribencarb.

Comparative Example 10

Pyribencarb (18.8 parts), calcium lignin sulfonate having purity of 83% by mass (containing 1% by mass of reducing sugars, 7% by mass of sugar sulfonic acids, 9% by mass of inorganic salts, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (69.59 parts) were mixed and wet-pulverized to prepare an agrochemical composition (aqueous suspension preparation) containing 18.8% by mass of pyribencarb.

Comparative Example 11

Pyribencarb (18.8 parts), calcium lignin sulfonate having purity of 81% by mass (7% by mass of reducing sugars, 7% by mass of sugar sulfonic acids, 5% by mass of inorganic acids, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (69.59 parts) were mixed and wet-pulverized to prepare an agrochemical composition (aqueous suspension preparation) containing 18.8% by mass of pyribencarb.

Reference Example 1

Polyoxyethylenetristyrylphenyl ether phosphate potassium salt (10 parts), polyoxyethylene/polyoxypropylene block copolymer (2 parts), polyalkyl polysiloxane (0.1 parts), propylene glycol (10 parts), xanthan gum (0.28 parts) and water (77.62 parts) were mixed and wet-pulverized to prepare an aqueous composition which was same as an agrochemical composition of Comparative Example 1 except that pyribencarb was replaced with water.

Reference Example 2

Polyoxyethylenestyrylphenyl ether sulfate sodium salt (0.94 parts), polyoxyethylenestyrylphenyl ether (0.94 parts), sodium dodecylbenzenesulfonate (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (87.14 parts) were mixed and wet-pulverized to prepare an aqueous composition which was same as an agrochemical composition of Comparative Example 4 except that pyribencarb was replaced with water.

Reference Example 3

Calcium lignin sulfonate having purity of 81% by mass (containing 7% by mass of reducing sugars, 7% by mass of sugar sulfonic acids, 5% by mass of inorganic salts as impurities, 0.63 parts), sodium polyacrylate having mass average molecular weight of about 38,000 (0.1 parts), polyalkyl polysiloxane (0.1 parts), propylene glycol (10 parts), xanthan gum (0.28 parts), sodium polyacrylate having mass average molecular weight of about 4,000 (0.5 parts) and water (88.39 parts) were mixed and wet-pulverized to prepare an aqueous composition which was same as an agrochemical composition of Comparative Example 11 except that pyribencarb was replaced with water.

Test Example 1

Finely pulverized pyribencarb (2.3 g) or an agrochemical composition or aqueous composition of Examples 2, 6, 8 and 11, Comparative Examples 1, 4 and 11, or Reference Examples 1 to 3 (12.5 mL) as a first agent, and commercially available agrochemical composition containing etofenprox, i.e., trade name "TREBON® EC" (manufactured by MITSUI CHEMICAL AGRO, 12.5 mL) or trade name "TREBON® EW" (manufactured by MITSUI CHEMICAL AGRO, 25 mL) as a second agent, and a predetermined amount water were mixed to make total amount 200 mL. This mixture and a stirring bar were placed in a 500 mL beaker, and after stirring for 15 minutes using a magnetic stirrer, the product was passed through a sieve having opening of 63 μm and examined for the presence/absence of aggregates left on the sieve. The results are shown in Table 1.

TABLE 1

| First Agent | Second Agent | Aggregate |
|---|---|---|
| Pyribencarb | Trade name "TREBON® EC" | Much |
| Pyribencarb | Trade name "TREBON® EW" | Much |
| Example 2 | Trade name "TREBON® EC" | None |
| Example 2 | Trade name "TREBON® EW" | None |
| Example 6 | Trade name "TREBON® EC" | None |
| Example 6 | Trade name "TREBON® EW" | None |
| Example 8 | Trade name "TREBON® EC" | None |
| Example 8 | Trade name "TREBON® EW" | None |
| Example 11 | Trade name "TREBON® EC" | None |
| Example 11 | Trade name "TREBON® EW" | None |
| Comparative Example 1 | Trade name "TREBON® EC" | Much |
| Comparative Example 1 | Trade name "TREBON® EW" | Much |
| Comparative Example 4 | Trade name "TREBON® EC" | Much |
| Comparative Example 4 | Trade name "TREBON® EW" | Much |

TABLE 1-continued

| First Agent | Second Agent | Aggregate |
|---|---|---|
| Comparative Example 11 | Trade name "TREBON® EC" | Much |
| Comparative Example 11 | Trade name "TREBON® EW" | Much |
| Reference Example 1 | Trade name "TREBON® EC" | None |
| Reference Example 1 | Trade name "TREBON® EW" | None |
| Reference Example 2 | Trade name "TREBON® EC" | None |
| Reference Example 2 | Trade name "TREBON® EW" | None |
| Reference Example 3 | Trade name "TREBON® EC" | None |
| Reference Example 3 | Trade name "TREBON® EW" | None |

As is obvious from these results, the agrochemical compositions of the Comparative Examples containing pyribencarb generate aggregates when blended with an agrochemical composition containing etofenprox, and therefore has problems in blendability of both compositions, and aggregate formation is attributable to pyribencarb. However, blending the agrochemical composition of the present invention and an agrochemical composition containing etofenprox did not generate such aggregates.

Test Example 2

Each of agrochemical compositions of Examples, Comparative Examples (12.5 mL) as a first agent and commercially available agrochemical composition containing etofenprox, i.e., trade name "TREBON AIR" (manufactured by MITSUI CHEMICAL AGRO, 25 mL) as a second agent, and a predetermined amount water were mixed to make total amount 200 mL, thus an agrochemical solution for spraying was prepared. This agrochemical solution for spraying was placed in a 500 mL beaker, and after stirring using a stirrer (trade name "Three-One Motor TYPE: 600G", manufactured by SHINTO SCIENTIFIC) for 15 minutes, the product was passed through a sieve having opening of 63 μm, and examined for the presence/absence of aggregates left on the sieve. The results are shown in Table 2. When 12.5 mL of the first agent or 25 mL of the second agent was solely mixed with a predetermined amount of water to make total amount 200 mL to prepare an agrochemical solution for spraying which was processed according to the foregoing, no aggregates were left on the sieve in the test using any of the first agent and the second agent.

TABLE 2

| First Agent | Second Agent | Aggregate |
|---|---|---|
| Example 1 | Trade name "TREBON® AIR" | None |
| Example 2 | Trade name "TREBON® AIR" | None |
| Example 3 | Trade name "TREBON® AIR" | None |
| Example 4 | Trade name "TREBON® AIR" | None |
| Example 5 | Trade name "TREBON® AIR" | None |
| Example 6 | Trade name "TREBON® AIR" | None |
| Example 7 | Trade name "TRERON® AIR" | None |
| Example 8 | Trade name "TREBON® | None |

TABLE 2-continued

| First Agent | Second Agent | Aggregate |
|---|---|---|
| Example 9 | Trade name "TRESON® AIR" | Trace |
| Example 10 | Trade name "TREBON® AIR" | Trace |
| Example 11 | Trade name "TREBON® AIR" | None |
| Comparative Example 1 | Trade name "TREBON® AIR" | Much |
| Comparative Example 2 | Trade name "TREBON® AIR" | Much |
| Comparative Example 3 | Trade name "TREBON® AIR" | Much |
| Comparative Example 4 | Trade name "TREBON® AIR" | Much |
| Comparative Example 5 | Trade name "TREBON® AIR" | Much |
| Comparative Example 6 | Trade name "TREBON® AIR" | Much |
| Comparative Example 7 | Trade name "TREBON® AIR" | Much |
| Comparative Example 8 | Trade name "TREBON® AIR" | Much |
| Comparative Example 9 | Trade name "TREBON® AIR" | Much |
| Comparative Example 10 | Trade name "TREBON® AIR" | Much |
| Comparative Example 11 | Trade name "TREBON® AIR" | Much |

The agrochemical solution for spraying containing the agrochemical composition of the present invention blended with an agrochemical composition containing etofenprox generated no aggregates or, if any, negligible aggregates, i.e., extremely small amounts of aggregate without producing practical problem, and blendability of both compositions were good. On the other hand, agrochemical solution for spraying containing an agrochemical composition of Comparative Examples blended with an agrochemical composition containing etofenprox generated a large amount of aggregates, and blendability of both compositions was bad.

Test Example 3

An agrochemical composition of Examples 1, 2, 8, 9, 10 and 11 and Comparative Examples 1 and 2 in an amount of 400 mL each as a first agent and 800 mL of commercially available agrochemical composition containing etofenprox, i.e., trade name "TREBON® AIR" (manufactured by MITSUI CHEMICAL AGRO) were mixed with a predetermined amount of water to make total amount 6.4 L to prepare an agrochemical solution for spraying. This agrochemical solution for spraying was intended to be applied onto agricultural land or the like by aerial spraying in an amount of 8 L/ha including about 100 g/ha of pyribencarb and about 100 g/ha of etofenprox. The agrochemical solution for spraying was charged in a liquid spraying device mounted on an industrial unmanned helicopter, trade name "R-MAX: Type II" (manufactured, by YAMAHA MOTOR), and the agrochemical solution for spraying was ejected from a nozzle at the specified speed of 32 mL/sec while cycling at pumping operation voltage of 7.8 V, and time required to evacuate the total amount of agrochemical solution for spraying was recorded. These operations were taken as one cycle, and the ejected agrochemical solution for spraying was received in a bucket, re-charged in the liquid spraying device, and the ejection operations were repeated up to 5 cycles. In the case where a decrease in ejection speed, that is, ejection failure was observed during the test, the test was terminated at that point. The results are shown in Table 3.

TABLE 3

| First Agent | Second Agent | Time required for ejection (min) | |
|---|---|---|---|
| Example 1 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5th Cycle | 3.4 |
| Example 2 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5th Cycle | 3.4 |
| Example 8 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5th Cycle | 3.4 |
| Example 9 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5th Cycle | 3.4 |
| Example 10 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5th Cycle | 3.4 |
| Example 11 | Trade name "TREBON® AIR" | 1st Cycle | 3.4 |
| | | 2nd Cycle | 3.4 |
| | | 3rd Cycle | 3.4 |
| | | 4th Cycle | 3.4 |
| | | 5thCycle | 3.4 |
| Comparative Example 1 | Trade name "TREBON® AIR" | 1st Cycle | 3.8 |
| | | 2nd Cycle | 5 or more |
| | | From 3rd Cycle onward | Discontinued |
| Comparative Example 2 | Trade name "TREBON® AIR" | 1st Cycle | 4.0 |
| | | 2nd Cycle | 5 or more |
| | | From 3rd Cycle onward | Discontinued |

An agrochemical composition for spraying using the agrochemical composition of the present invention blended with an agrochemical composition containing etofenprox exhibited good ejection performance using actual machine and enabled blend spraying. On the other hand, an agrochemical solution for spraying solution using a blend of the agrochemical composition of Comparative Example and an agrochemical composition containing etofenprox generated aggregates which were clogged in the flow path in the actual machine, and the discharge speed decreased upon repeated test. That is, it was impossible to conduct blend spraying.

The invention claimed is:
1. An agrochemical composition comprising:
a composition (i) comprising:
  (A) pyribencarb, and
  (B) a surfactant consisting of (B1) a lignin sulfonic acid salt having purity of 85% by mass or more, wherein a content of reducing sugars is less than 5% by mass and a content of sugar sulfonic acids is less than 6% by mass, and (B2) a monoalkylaryl sulfonic acid salt formalin condensate and/or a polycarboxylic acid salt having mass average molecular weight of 5,000 to 50,000, and
a composition (ii) comprising etofenprox.
2. The agrochemical composition according to claim 1, wherein the monoalkylaryl sulfonic acid salt formalin condensate is a C1 to C4 alkylnaphthalene sulfonic acid salt formalin condensate.

3. The agrochemical composition according to claim 1, wherein the compounding ratio of the (B) surfactant is present in 1% by mass or less based on the total amount of the composition.

4. The agrochemical composition according to claim 1, wherein the composition (i) further comprises an antifoaming agent.

5. The agrochemical composition according to claim 4, wherein the compounding ratio of the antifoaming agent is 0.01 to 0.5% by mass based on the total amount of the composition (i).

6. The agrochemical composition according claim 1, wherein the composition (i) comprises no water-insoluble organic solvent.

7. The agrochemical composition according to claim 1, wherein the composition (i) is an aqueous suspension preparation.

8. A method for spraying mixed agrochemicals, comprising diluting a mixture of the agrochemical composition according to claim 1 in water to obtain a mixed agrochemical spray solution, and spraying the mixed agrochemical spray solution onto agricultural land or non-agricultural land.

9. The method for spraying mixed agrochemicals according to claim 8, wherein the spraying is an aerial spraying conducted from an aircraft.

10. A mixed agrochemical preparation, comprising a mixture of
a composition (i) comprising:
   (A) pyribencarb, and
   (B) a surfactant consisting of (B1) a lignin sulfonic acid salt having purity of 85% by mass or more, wherein a content of reducing sugars is less than 5% by mass and a content of sugar sulfonic acids is less than 6% by mass, and (B2) a monoalkylaryl sulfonic acid salt formalin condensate and/or a polycarboxylic acid salt having mass average molecular weight of 5,000 to 50,000, and
a composition (ii) comprising etofenprox,
   wherein
   the compounding ratio of the (B1) lignin sulfonic acid salt having purity of 85% by mass or more, wherein the content of the reducing sugars is less than 5% by mass and the content of the sugar sulfonic acids is less than 6% by mass, is 0.1 to 0.95% by mass; and
   the compounding ratio of the (B2) monoalkylarylsulfonic acid salt formalin condensate and/or the polycarboxylic acid salt having mass average molecular weight of 5,000 to 50,000 is 0.05 to 0.5% by mass,
   based on the total amount of the composition (i).

* * * * *